(12) United States Patent
Shinn et al.

(10) Patent No.: US 8,181,166 B2
(45) Date of Patent: *May 15, 2012

(54) SYSTEM AND METHOD FOR DETERMINING WHEN AN EJB COMPILER NEEDS TO BE EXECUTED

(75) Inventors: Matthew Shinn, San Francisco, CA (US); Seth White, San Francisco, CA (US); Rob Woollen, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1139 days.

This patent is subject to a terminal disclaimer.

(21) Appl. No.: 11/927,096

(22) Filed: Oct. 29, 2007

(65) Prior Publication Data

US 2008/0066054 A1 Mar. 13, 2008

Related U.S. Application Data

(63) Continuation of application No. 10/785,846, filed on Feb. 24, 2004, now Pat. No. 7,290,250.

(60) Provisional application No. 60/450,645, filed on Feb. 28, 2003.

(51) Int. Cl.
*G06F 9/45* (2006.01)
*G06F 9/44* (2006.01)
*G06F 9/455* (2006.01)

(52) U.S. Cl. ........ 717/140; 717/145; 717/148; 717/165; 717/174

(58) Field of Classification Search .................. None
See application file for complete search history.

(56) References Cited

U.S. PATENT DOCUMENTS

| 5,978,585 | A | 11/1999 | Crelier | |
|---|---|---|---|---|
| 6,557,100 | B1 | 4/2003 | Knutson | |
| 6,892,202 | B2 * | 5/2005 | Arcand | 717/118 |
| 7,080,361 | B2 * | 7/2006 | Aigen | 717/137 |
| 7,428,728 | B2 * | 9/2008 | Tewksbary | 717/141 |
| 7,707,544 | B2 * | 4/2010 | Beust | 717/106 |
| 2002/0104071 | A1 * | 8/2002 | Charisius et al. | 717/109 |
| 2002/0170046 | A1 * | 11/2002 | Goward et al. | 717/162 |
| 2003/0055820 | A1 * | 3/2003 | Aigen | 707/4 |
| 2003/0200526 | A1 * | 10/2003 | Arcand | 717/102 |

(Continued)

FOREIGN PATENT DOCUMENTS

WO 0116719 8/2001

OTHER PUBLICATIONS

BEA WebLogic Server 4.5 Using the WebLgoic EJB Deployment Wizard, published in 2000, pp. 1-31.*

(Continued)

*Primary Examiner* — Tuan Dam
*Assistant Examiner* — Zheng Wei
(74) *Attorney, Agent, or Firm* — Fliesler Meyer LLP

(57) ABSTRACT

A system for determining when an EJB compiler needs to be executed, comprising: a server, including an EJB or plurality of EJBs and an EJB compiler operating thereon that determines a first snapshot of the EJB at a particular moment in time or for a particular server version, and a second snapshot of said EJB at a later moment in time or a subsequent server version, and compares the first and second snapshots to determine whether the EJB should be recompiled.

15 Claims, 1 Drawing Sheet

U.S. PATENT DOCUMENTS

| | | | |
|---|---|---|---|
| 2003/0212987 A1* | 11/2003 | Demuth et al. | 717/130 |
| 2004/0015839 A1* | 1/2004 | Sarkar et al. | 717/108 |
| 2004/0093588 A1 | 5/2004 | Gschwind et al. | |
| 2004/0103389 A1* | 5/2004 | Song et al. | 717/107 |
| 2004/0111701 A1* | 6/2004 | Beust | 717/108 |
| 2006/0053410 A1* | 3/2006 | Charisius et al. | 717/109 |

OTHER PUBLICATIONS

BEA WebLogic Server 4.5 Using WebLgoic Enterprise JavaBeans, published on Sep. 20, 1999, pp. 1-30.*

Borland JBuilder Version 8, Enterprise JavaBeans Developers Guide, published in 2002, pp. 1-413.*

BEA WebLogic Server Version 6.1—Developing WebLogic Server Applications, Jun. 24, 2002, BEA Systems, http://edocs.bea.com/wls/docs61/pdf/programming.pdf, pp. 1.6-1.7.

Brunner, R. et al., Java Web Services Unleashed, Apr. 16, 2002, Sams, ISBN: 978-0-672-32363-8, 12 pages.

BEA WebLogic Server 6.1—Programming WebLogic Enterprise JavaBeans, Feb. 26, 2003, BEA Systems, http://edocs.bea.com/wls/docs611pdf/ejb.pdf, pp. 6.11-6.12.

"Using WebLogic Enterprise JavaBeans", pp. 1-30 http://web.archive.org/web/20021015004909/http://www.weblogic.com/docs/classdocs/API_ejb.html.

"Using WebLogic's Distributed Server-Side Beans", pp. 1-11, http://web.archive.org/web/20010520113418/http://www.inf.fu-berlin.de/lehre/WS00/SWT/BEA/documentation/docs51/classdocs/API_bean.html#overview.

Dmitriev, "Language-Specific Make Technology for the Java Programming Language",OOPSLA 2002, Nov. 4-8, 2002.

Enterprise JavaBeans from Webopedia, http://www.webopedia.com/TERM/E/Enterprise_JavaBeans.html.

Schwanke et al., "Smarter Recompilation", 1998, ACM 0164-0925/88/1000-0627.

* cited by examiner

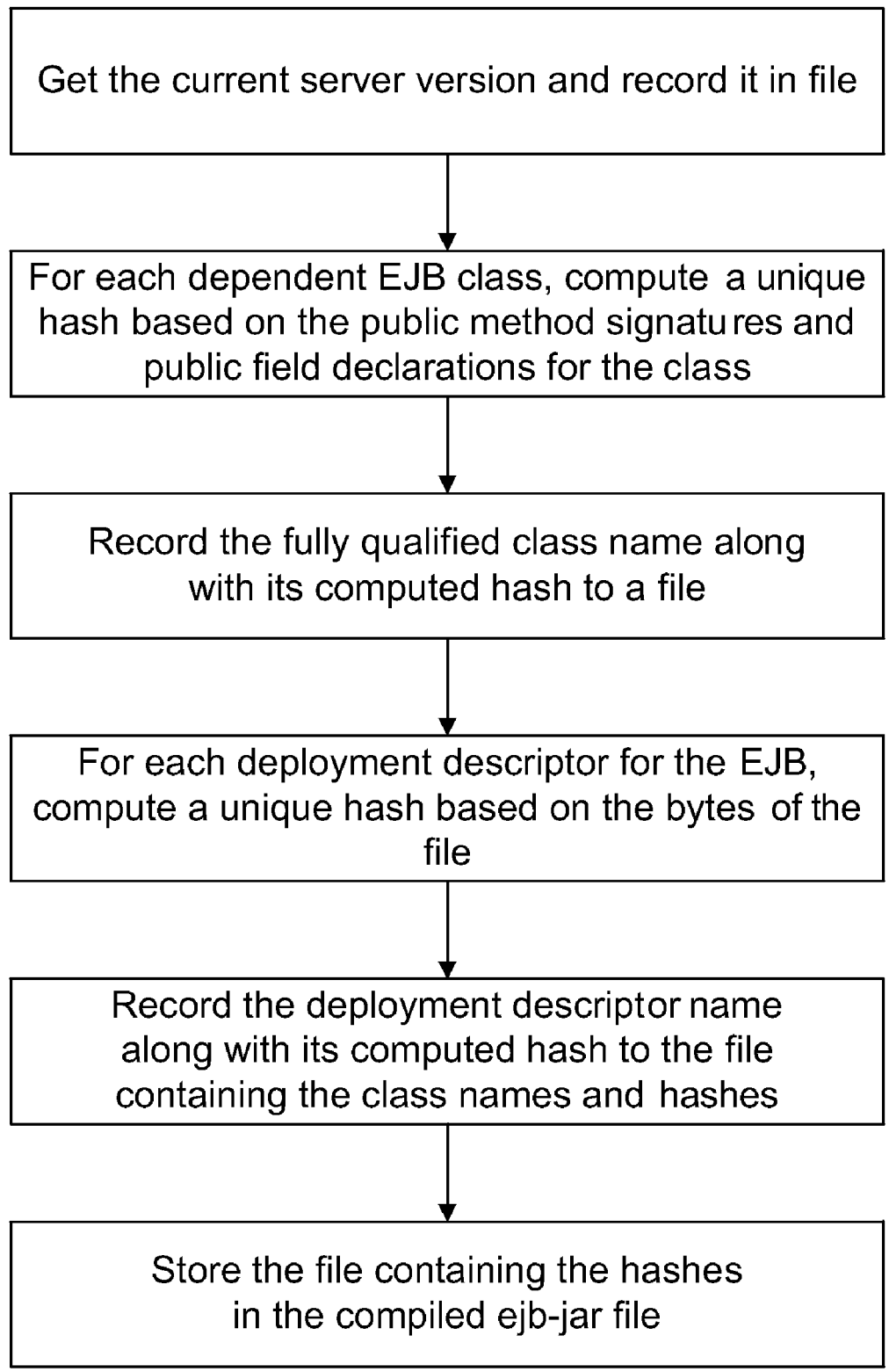

SYSTEM AND METHOD FOR DETERMINING WHEN AN EJB COMPILER NEEDS TO BE EXECUTED

CLAIM OF PRIORITY

This application is a continuation of U.S. application Ser. No. 10/785,846, filed Feb. 24, 2004, "SYSTEM AND METHOD FOR DETERMINING WHEN AN EJB COMPILER NEEDS TO BE EXECUTED", now U.S. Pat. No. 7,290,250, issued Oct. 30, 2007, which claims the benefit of U.S. Provisional Patent Application 60/450,645, filed Feb. 28, 2003, each of which applications are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to application servers and software development systems, and particularly to a system and method for determining when an EJB compiler needs to be executed.

BACKGROUND

In a typical application server, for example the WebLogic Server product from BEA systems, Inc., for an EJB to be deployed in the server, the EJB Compiler must be invoked on the ejb-jar file containing the EJB prior to deployment. For each EJB in the ejb-jar file, the EJB Compiler is responsible for validating the EJB, generating wrapper classes for the EJB, compiling the generated wrapper classes and invoking the RMI Compiler when necessary. This can be a time consuming process, on the order of several seconds per EJB. For an ejb-jar file with a large number of EJBs, the combined time can be significant.

To make matters worse, the EJB Compiler usually needs to be run each time the ejb-jar file is updated. An ejb-jar file is typically updated several times as it is developed. Compounding the issue further is the fact that the EJB Compiler is often invoked via a script, which doesn't typically have logic to determine whether the EJB Compiler actually needs to be invoked or not. This means the script invokes the EJB Compiler even when it doesn't need to, wasting valuable time.

The EJB Compiler also needs to be run after the server is upgraded, since the classes generated by the EJB Compiler may be incompatible with the new server code. If, after upgrading to a new server version, the user forgets to run the EJB Compiler before deploying the EJB, unexpected errors can result.

Another problem is that users may forget to run the EJB Compiler on an EJB after updating it. This can also lead to unexpected errors when the EJB is deployed since the classes generated by the EJB Compiler may no longer be compatible with the EJB.

SUMMARY

The invention provides a system and method for determining when an EJB compiler needs to be executed. To determine if an EJB needs to be recompiled or not, we need to know the state of the EJB and the server version of when it was last compiled. Once we have this information, we can compare it to the current state of the EJB and current server version to determine whether we need to rerun the EJB compiler or not. In accordance with one embodiment, the invention comprises the following steps: obtaining the current server version and recording it in a file; for each dependent EJB class, computing a unique hash based on the public method signatures and public field declarations for the class; recording the fully qualified class name along with its computed hash to a file; for each deployment descriptor for the EJB, computing a unique hash based on the bytes of the file; recording the deployment descriptor name along with its computed hash to the file containing the class names and hashes; and, storing the file containing the hashes in the compiled ejb-jar file.

BRIEF DESCRIPTION OF THE FIGURES

FIG. 1 shows a flowchart illustrating the algorithm or process that is run each time the EJB Compiler is invoked, in accordance with an embodiment of the invention.

DETAILED DESCRIPTION

The invention provides a system and method for determining when an EJB compiler needs to be executed. To determine if an EJB needs to be recompiled or not, the system needs to know the state of the EJB and the server version of when it was last compiled. Once this information is obtained, it can be compared to the current state of the EJB and current server version to determine whether to rerun the EJB compiler or not. Since only certain changes to an EJB require the EJB Compiler to be run, the comparison can be limited to attributes that would require the EJB Compiler to rerun. In accordance with one embodiment, the following changes require an EJB to be recompiled:

Any change to a deployment descriptor for an EJB.

Any change to a public method signature (including addition or removal of a public method) of a dependent EJB class (i.e. an EJB implementation class, interface, or primary key class).

Any change to a public field declaration (including addition or removal of a public field) of a dependent EJB class.

Having the ability to determine when the EJB Compiler must be rerun allows the system to automatically rerun the compiler, when necessary, inside of the server. For instance, if the user upgrades the server and forgets to rerun the EJB Compiler, the system can detect that the EJB Compiler needs to be rerun and automatically do this for the user when the EJB is deployed to the server. Similarly, the system can also automatically run the EJB Compiler if the user forgets to rerun the compiler after updating her EJB. This is very helpful since it avoids situations where unexpected errors can occur during deployment due to incompatibilities with the classes generated by the EJB Compiler.

EJB Compiler Algorithm

FIG. 1 shows a flowchart illustrating the algorithm or process that is used by the system, in accordance with an embodiment of the invention. The algorithm is run each time the EJB Compiler is invoked. It provides a relative snapshot of the EJB and server version at the time the EJB is compiled. As shown in FIG. 1, the algorithm or process comprises the following steps:

1. Get the current server version and record it in a file.

2. For each dependent EJB class, compute a unique hash based on the public method signatures and public field declarations for the class.

3. Record the fully qualified class name along with its computed hash to a file.

4. For each deployment descriptor for the EJB, compute a unique hash based on the bytes of the file.

5. Record the deployment descriptor name along with its computed hash to the file containing the class names and hashes.

6. Store the file containing the hashes in the compiled ejb-jar file.

With this snapshot, the system can determine, at a later time, whether it needs to rerun the EJB Compiler for a given EJB. If the current snapshot of the EJB is equal to the snapshot of the EJB when it was last compiled, then we don't need to recompile.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, it will be evident that while the examples described herein illustrate how the invention may be used in a WebLogic environment, other application servers, and computing environments may use and benefit from the invention.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

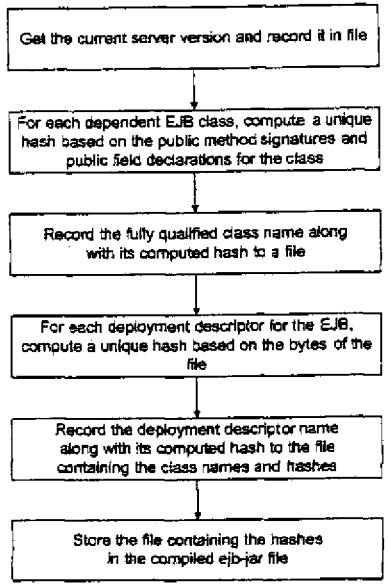

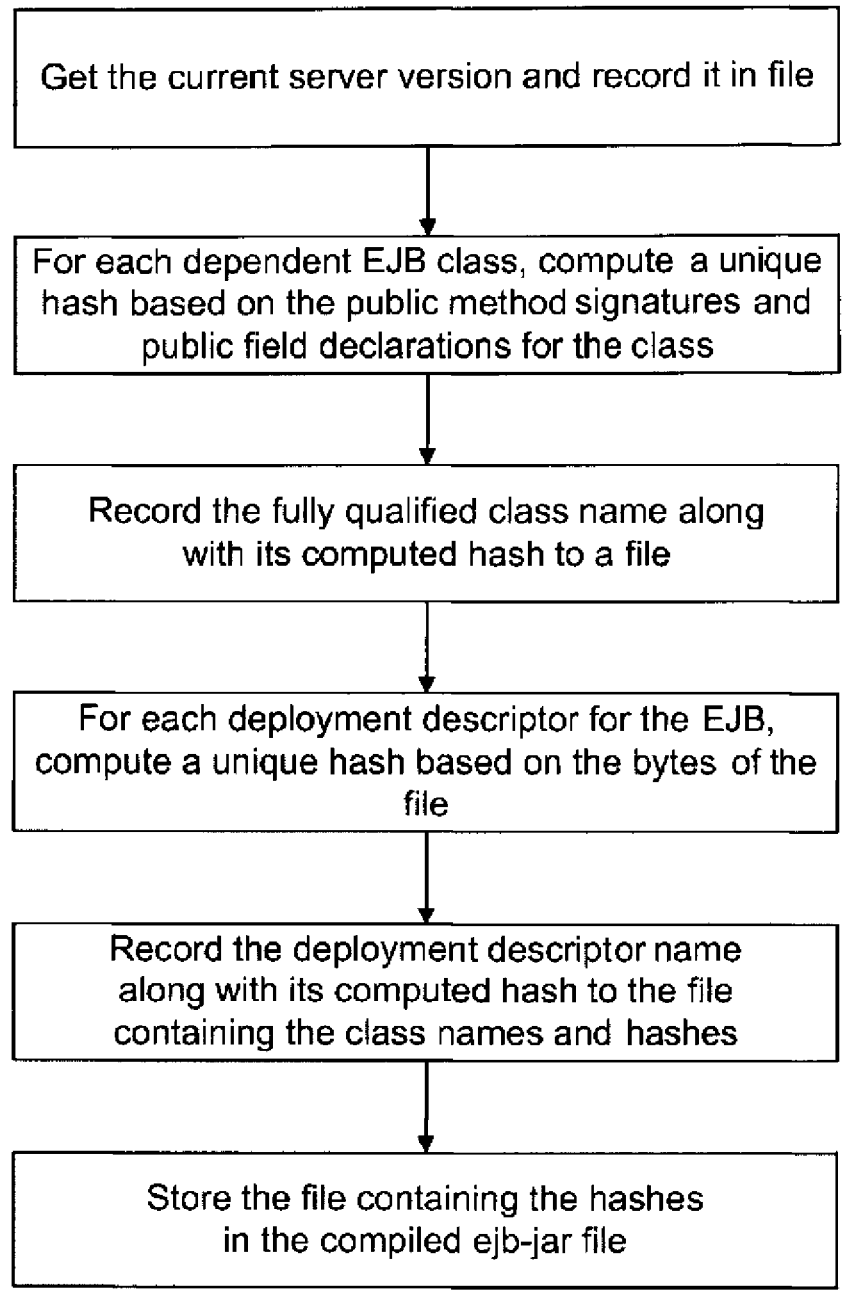

What is claimed is:

1. A system for compiling Enterprise JavaBean (EJB) classes, comprising:
    a server, having a server version information associated therewith and executing a plurality of compiled EJB classes stored thereon;
    an ejb-jar file for storing the plurality of compiled EJB classes, together with, for each EJB class therein, a first snapshot of deployment related version information for that EJB class, wherein the first snapshot defines a deployment descriptor for the EJB class and the version of both the EJB class and the server, at the time that particular EJB class was compiled; and
    an EJB compiler that generates wrapper classes for each EJB class, including wherein the EJB compiler, following deployment of a previously compiled EJB class to a new version of the server, at a later point in time, automatically determines a second snapshot of deployment related version information for the new version of the server, and compares the first and second snapshots to determine whether the EJB compiler needs to be invoked again on the previously compiled EJB class, and if so automatically generates wrapper classes for use with the new version of the server.

2. The system of claim 1 wherein the EJB compiler performs the step, for each EJB class, of:
    obtaining a current server version and storing it to a snapshot file;
    for each dependent EJB class, computing a unique hash based on public method signatures and public field declarations for the EJB class;
    recording a fully qualified class name along with its computed hash to the snapshot file;
    for each deployment descriptor, computing a unique hash;
    recording the deployment descriptor name along with its computed hash to the snapshot file; and
    associating the snapshot file with the EJB class.

3. The system of claim 2 wherein for each dependent EJB class computing a unique hash is based on the public method signatures and public field declarations for the class.

4. The system of claim 2 wherein for each deployment descriptor computing a unique hash is based on the bytes of the deployment descriptor file.

5. The system of claim 2 wherein the associating the snapshot file with the EJB class includes storing the snapshot file in the ejb-jar file.

6. A method for compiling Enterprise JavaBean (EJB) classes, comprising the steps of:
    providing a server, having a server version information associated therewith and executing a plurality of compiled EJB classes stored thereon;
    providing an ejb-jar file for storing the plurality of compiled EJB classes, together with, for each EJB class therein, a first snapshot of deployment related version information for that EJB class, wherein the first snapshot defines a deployment descriptor for the EJB class and the version of both the EJB class and the server, at the time that particular EJB class was compiled; and
    using an EJB compiler to generate wrapper classes for each EJB class, including wherein the EJB compiler, following deployment of a previously compiled EJB class to a new version of the server, at a later point in time, automatically determines a second snapshot of deployment related version information for the new version of the server, and compares the first and second snapshots to determine whether the EJB compiler needs to be invoked again on the previously compiled EJB class, and if so automatically generates wrapper classes for use with the new version of the server.

7. The method of claim 6 wherein the determining further comprises:
    obtaining a current server version and storing it to a snapshot file;
    for each dependent EJB class, computing a unique hash based on public method signatures and public field declarations for the EJB class;
    recording a fully qualified class name along with its computed hash to the snapshot file;
    for each deployment descriptor, computing a unique hash;
    recording the deployment descriptor name along with its computed hash to the snapshot file; and
    associating the snapshot file with the EJB class.

8. The method of claim 7 wherein for each dependent EJB class computing a unique hash is based on the public method signatures and public field declarations for the class.

9. The method of claim 7 wherein for each deployment descriptor computing a unique hash is based on the bytes of the deployment descriptor file.

10. The method of claim 7 wherein the associating the snapshot file with the EJB class includes storing the snapshot file in the ejb-jar file.

11. A non-transitory computer readable storage medium including instructions stored thereon which when executed cause the computer to perform the steps of:
   providing a server, having a server version information associated therewith and executing a plurality of compiled Enterprise JavaBean (EJB) classes stored thereon;
   providing an ejb-jar file for storing the plurality of compiled EJB classes, together with, for each EJB class therein, a first snapshot of deployment related version information for that EJB class, wherein the first snapshot defines a deployment descriptor for the EJB class and the version of both the EJB class and the server, at the time that particular EJB class was compiled; and
   using an EJB compiler to generate wrapper classes for each EJB class, including wherein the EJB compiler, following deployment of a previously compiled EJB class to a new version of the server, at a later point in time, automatically determines a second snapshot of deployment related version information for the new version of the server, and compares the first and second snapshots to determine whether the EJB compiler needs to be invoked again on the previously compiled EJB class, and if so automatically generates wrapper classes for use with the new version of the server.

12. The non-transitory computer readable storage medium of claim 11 wherein the determining further comprises:
   obtaining a current server version and storing it to a snapshot file;
   for each dependent EJB class, computing a unique hash based on public method signatures and public field declarations for the EJB class;
   recording a fully qualified class name along with its computed hash to the snapshot file;
   for each deployment descriptor, computing a unique hash;
   recording the deployment descriptor name along with its computed hash to the snapshot file; and
   associating the snapshot file with the EJB class.

13. The non-transitory computer readable storage medium of claim 12 wherein for each dependent EJB class computing a unique hash is based on the public method signatures and public field declarations for the class.

14. The non-transitory computer readable storage medium of claim 12 wherein for each deployment descriptor computing a unique hash is based on the bytes of the deployment descriptor file.

15. The non-transitory computer readable storage medium of claim 12 wherein the associating the snapshot file with the EJB class includes storing the snapshot file in the ejb-jar file.

* * * * *

UNITED STATES PATENT AND TRADEMARK OFFICE
CERTIFICATE OF CORRECTION

PATENT NO. : 8,181,166 B2  
APPLICATION NO. : 11/927096  
DATED : May 15, 2012  
INVENTOR(S) : Shinn et al.

Page 1 of 3

It is certified that error appears in the above-identified patent and that said Letters Patent is hereby corrected as shown below:

Delete the title page showing an illustrative figure and substitute the attached title page therefor.

On Title page, in column 2, under "Other Publications", line 1, delete "WebLgoic" and insert -- WebLogic --, therefor.

Title page 2, in column 1, under "Other Publications", line 1, delete "WebLgoic" and insert -- WebLogic --, therefor.

On sheet 1, in drawings, line 3, delete "signatu res" and insert -- signatures --, therefor.

Delete Figure 1 and substitute the attached Figure 1 therefor.

Signed and Sealed this
Seventh Day of August, 2012

David J. Kappos
*Director of the United States Patent and Trademark Office*

(12) United States Patent
Shinn et al.

(10) Patent No.: US 8,181,166 B2
(45) Date of Patent: *May 15, 2012

(54) SYSTEM AND METHOD FOR DETERMINING WHEN AN EJB COMPILER NEEDS TO BE EXECUTED

(75) Inventors: Matthew Shinn, San Francisco, CA (US); Seth White, San Francisco, CA (US); Rob Woollen, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1139 days.

This patent is subject to a terminal disclaimer.

(21) Appl. No.: 11/927,096

(22) Filed: Oct. 29, 2007

(65) Prior Publication Data
US 2008/0066054 A1  Mar. 13, 2008

Related U.S. Application Data

(63) Continuation of application No. 10/785,846, filed on Feb. 24, 2004, now Pat. No. 7,290,250.

(60) Provisional application No. 60/450,645, filed on Feb. 28, 2003.

(51) Int. Cl.
*G06F 9/45* (2006.01)
*G06F 9/44* (2006.01)
*G06F 9/455* (2006.01)

(52) U.S. Cl. ........ 717/140; 717/145; 717/148; 717/165; 717/174

(58) Field of Classification Search .............. None
See application file for complete search history.

(56) References Cited

U.S. PATENT DOCUMENTS

| | | | |
|---|---|---|---|
| 5,978,585 A | 11/1999 | Crelier | |
| 6,557,100 B1 | 4/2003 | Knutson | |
| 6,892,202 B2 * | 5/2005 | Arcand | 717/118 |
| 7,080,361 B2 * | 7/2006 | Aigen | 717/137 |
| 7,428,728 B2 * | 9/2008 | Tewksbary | 717/141 |
| 7,707,544 B2 * | 4/2010 | Beust | 717/106 |
| 2002/0104071 A1 * | 8/2002 | Charisius et al. | 717/109 |
| 2002/0170046 A1 * | 11/2002 | Goward et al. | 717/162 |
| 2003/0055820 A1 * | 3/2003 | Aigen | 707/4 |
| 2003/0200526 A1 * | 10/2003 | Arcand | 717/102 |

(Continued)

FOREIGN PATENT DOCUMENTS

WO  0116719  8/2001

OTHER PUBLICATIONS

BEA WebLogic Server 4.5 Using the WebLgoic EJB Deployment Wizard, published in 2000, pp. 1-31.*

(Continued)

*Primary Examiner* — Tuan Dam
*Assistant Examiner* — Zheng Wei
(74) *Attorney, Agent, or Firm* — Fliesler Meyer LLP

(57) ABSTRACT

A system for determining when an EJB compiler needs to be executed, comprising: a server, including an EJB or plurality of EJBs and an EJB compiler operating thereon that determines a first snapshot of the EJB at a particular moment in time or for a particular server version, and a second snapshot of said EJB at a later moment in time or a subsequent server version, and compares the first and second snapshots to determine whether the EJB should be recompiled.

15 Claims, 1 Drawing Sheet